May 16, 1933.    F. T. POWERS    1,909,424
PHOTOGRAPHIC CAMERA
Original Filed May 6, 1929    7 Sheets-Sheet 2
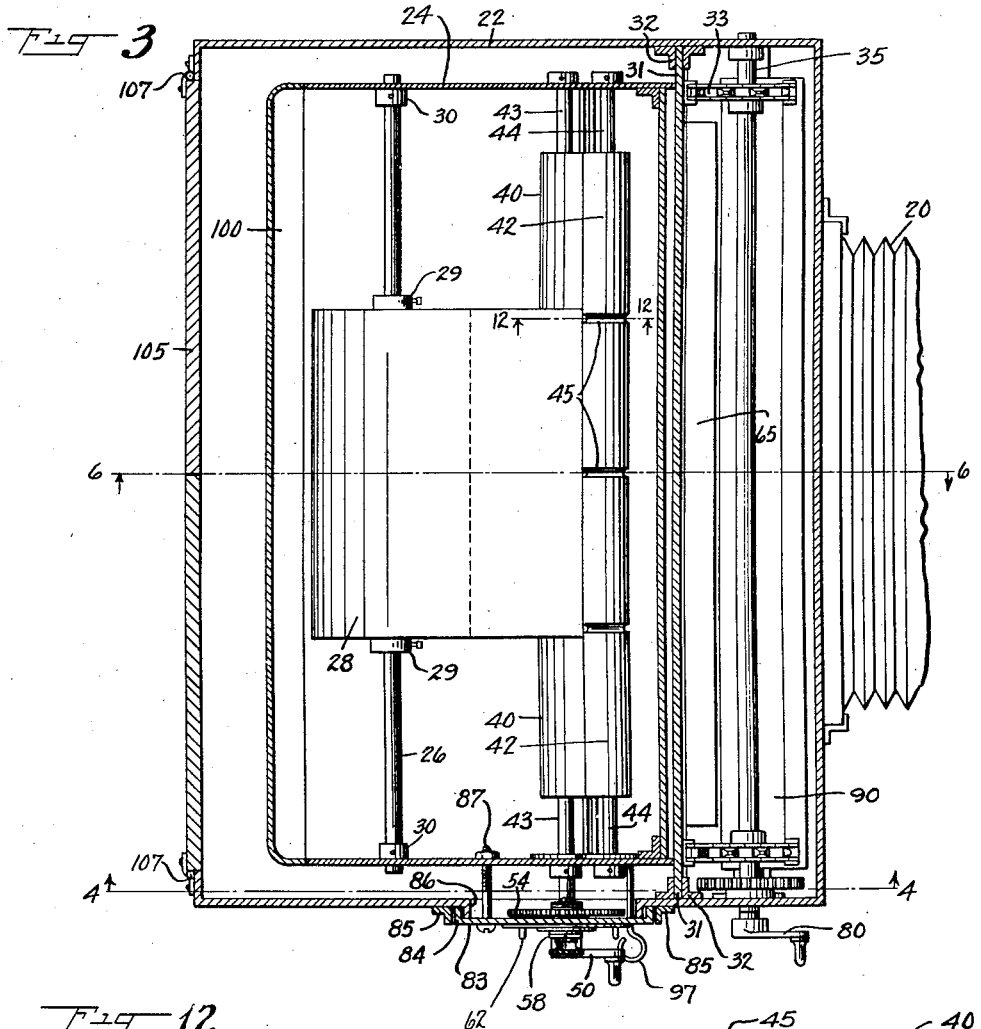
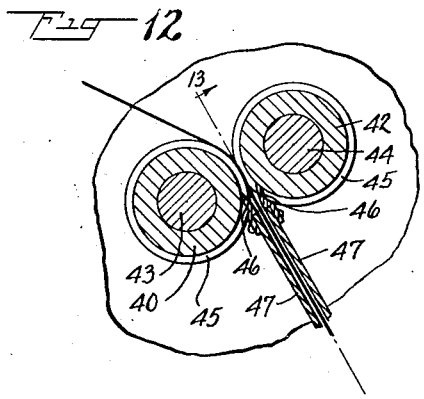
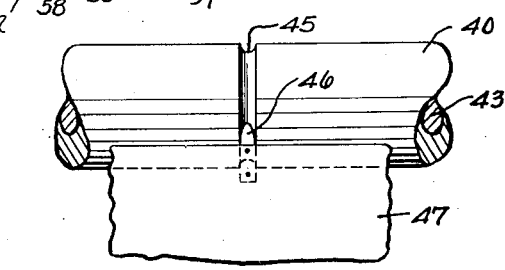

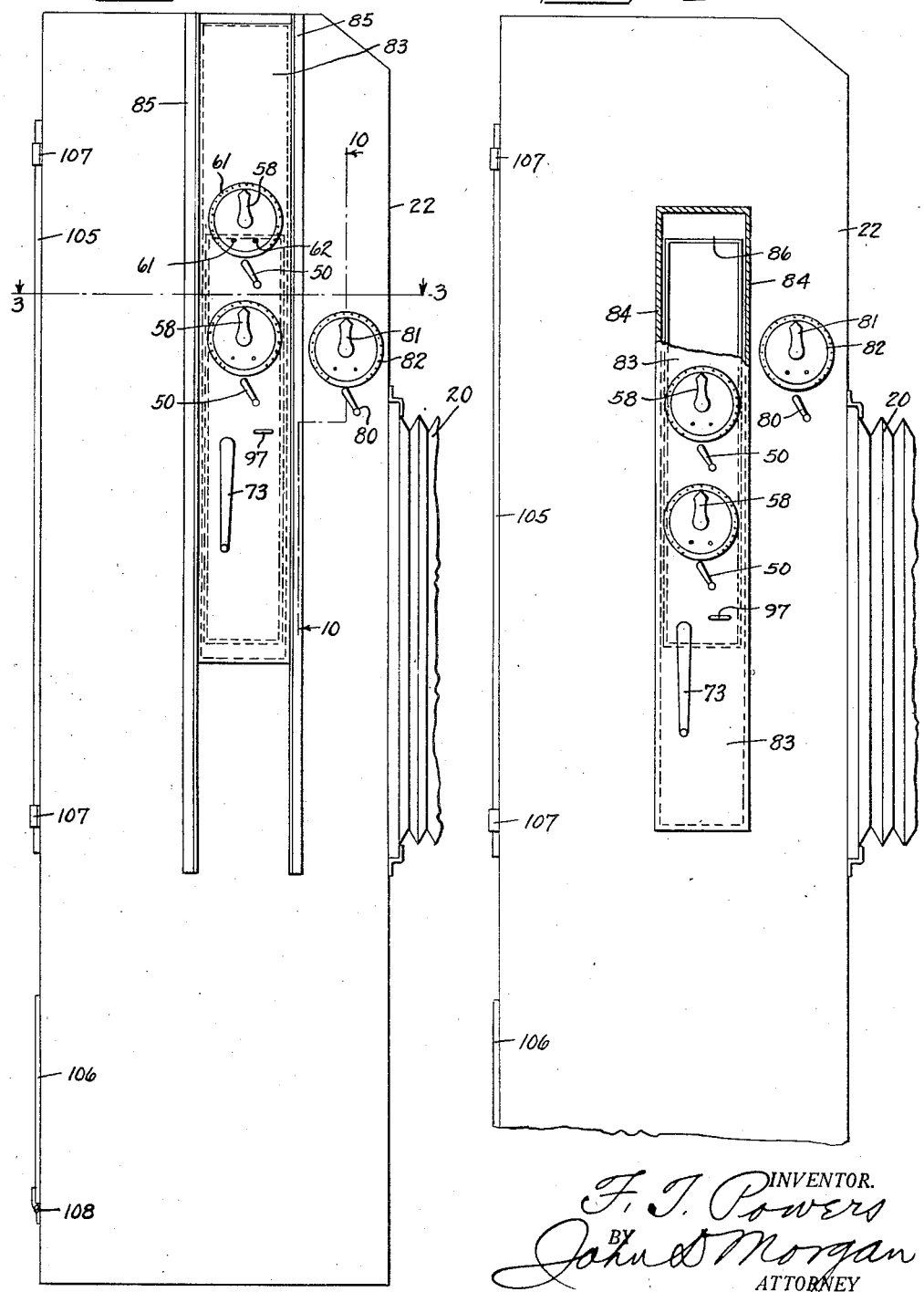

May 16, 1933.　　　F. T. POWERS　　　1,909,424
PHOTOGRAPHIC CAMERA
Original Filed May 6, 1929　　7 Sheets-Sheet 3
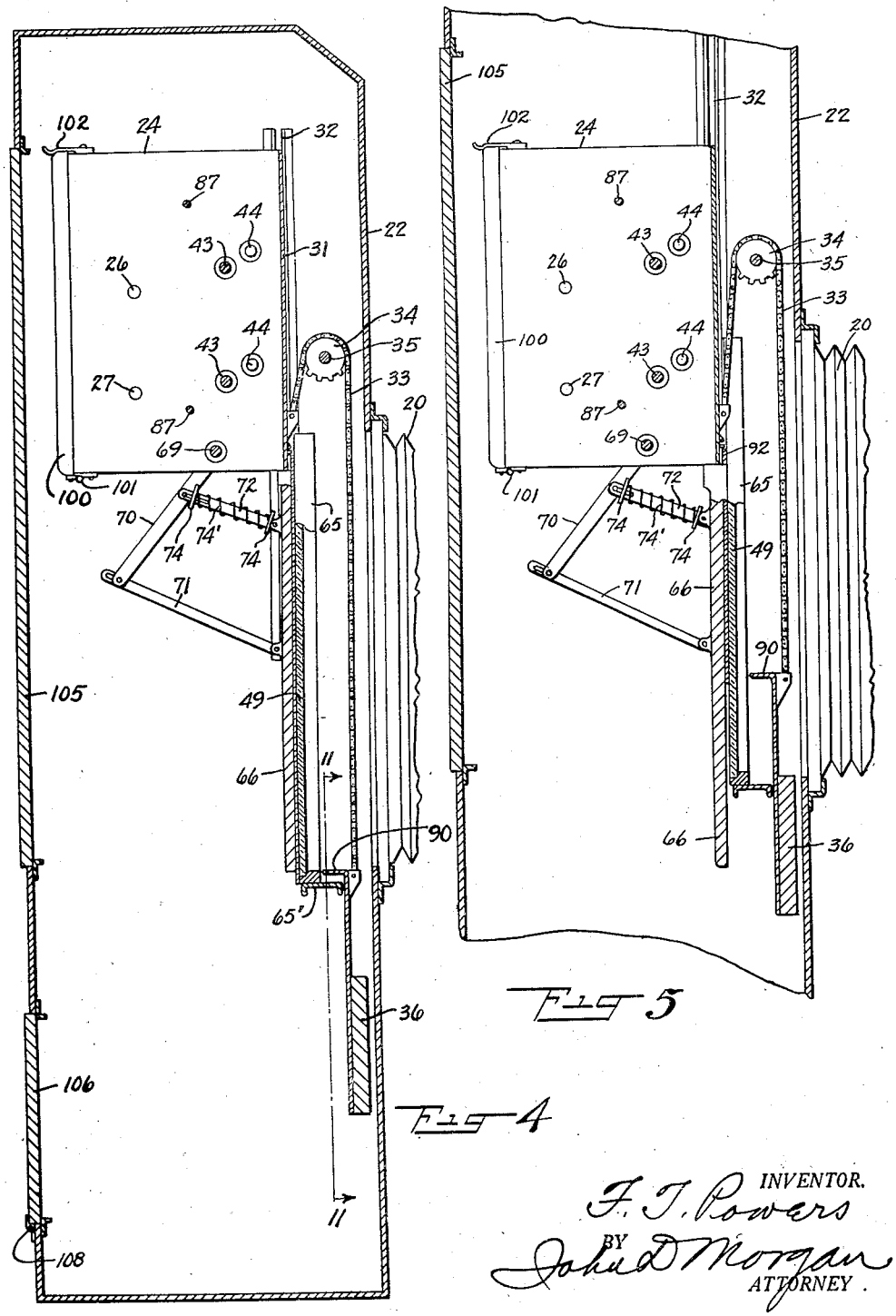

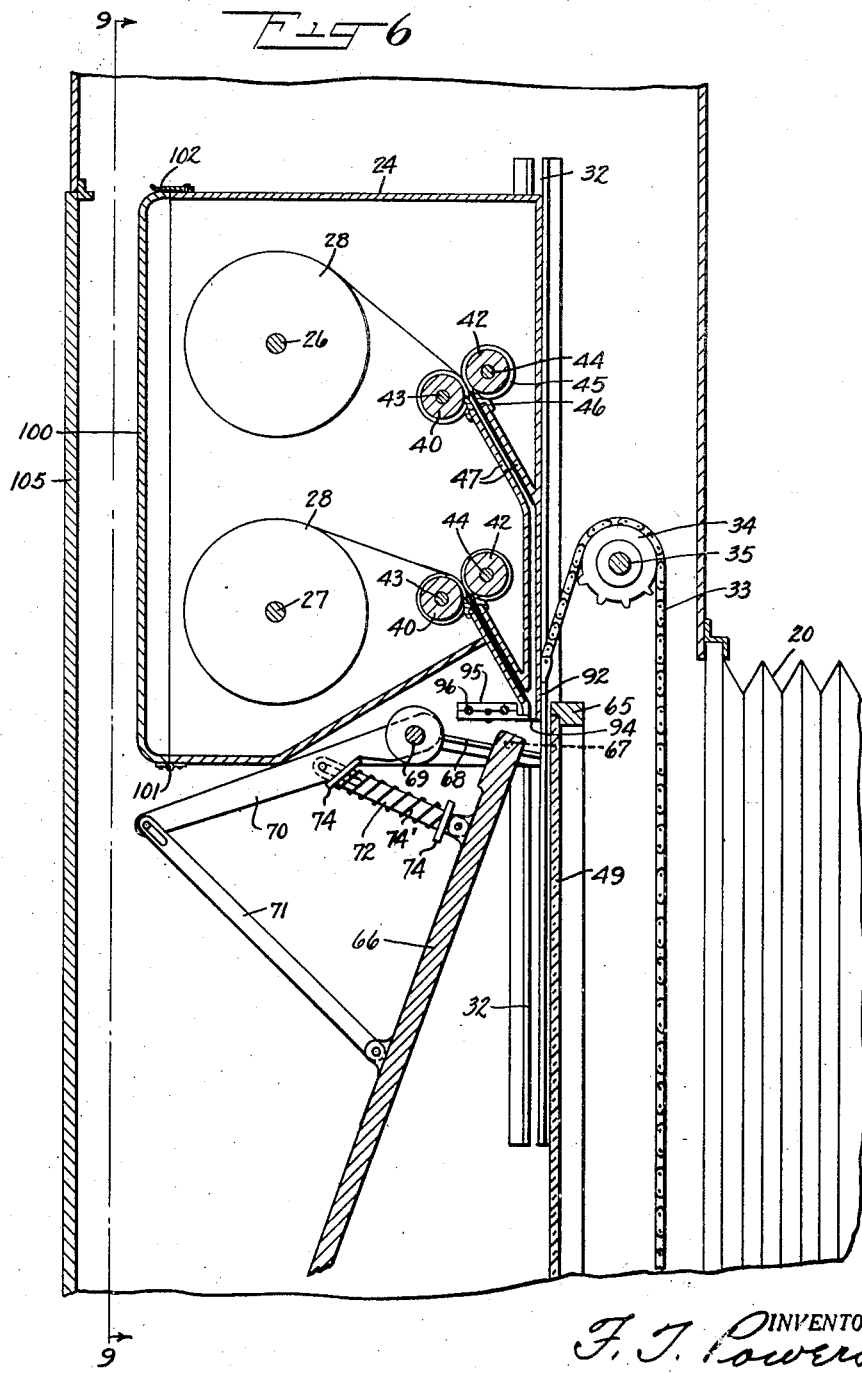

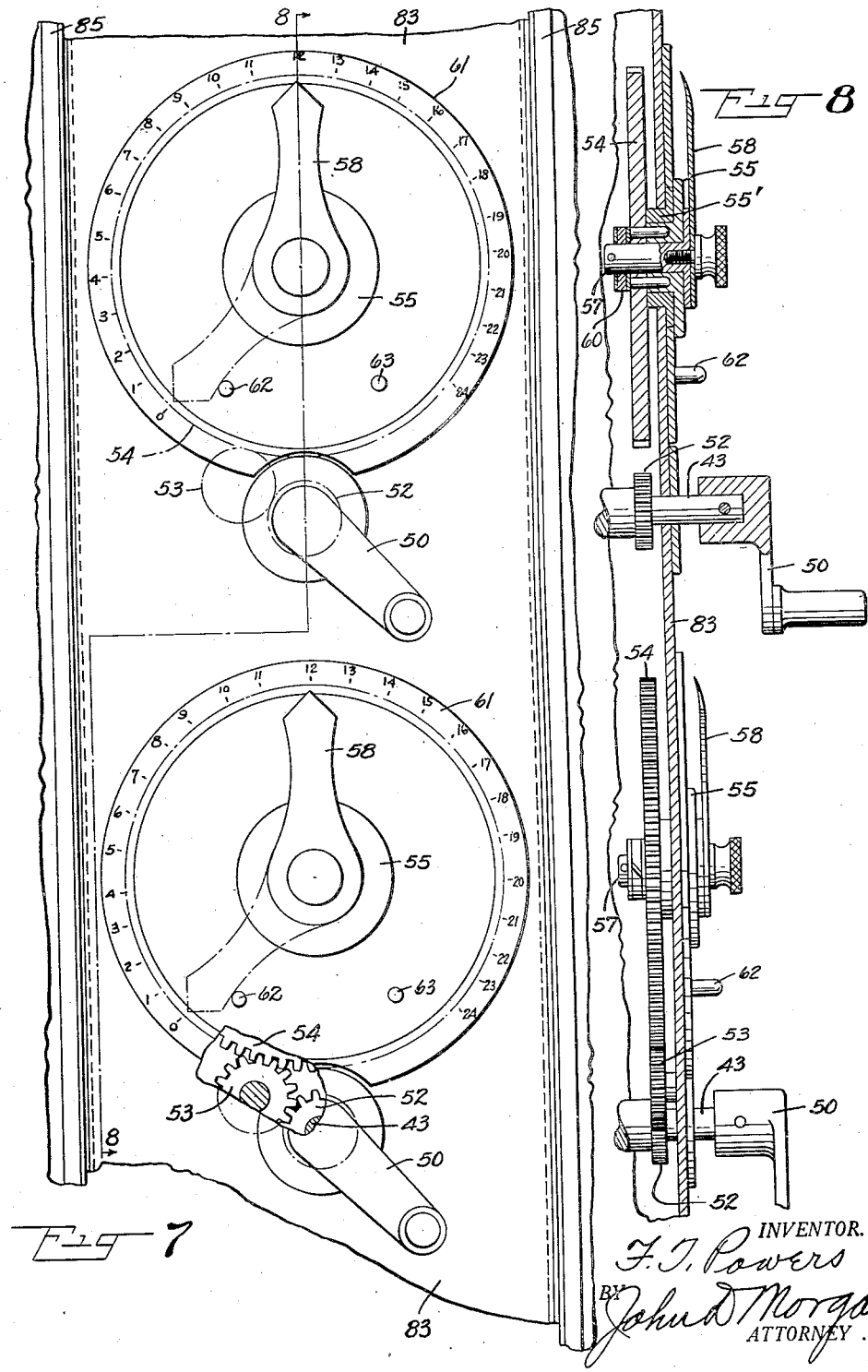

May 16, 1933.  F. T. POWERS  1,909,424
PHOTOGRAPHIC CAMERA
Original Filed May 6, 1929   7 Sheets-Sheet 6

May 16, 1933.　　　　F. T. POWERS　　　　1,909,424
PHOTOGRAPHIC CAMERA
Original Filed May 6, 1929　　7 Sheets-Sheet 7
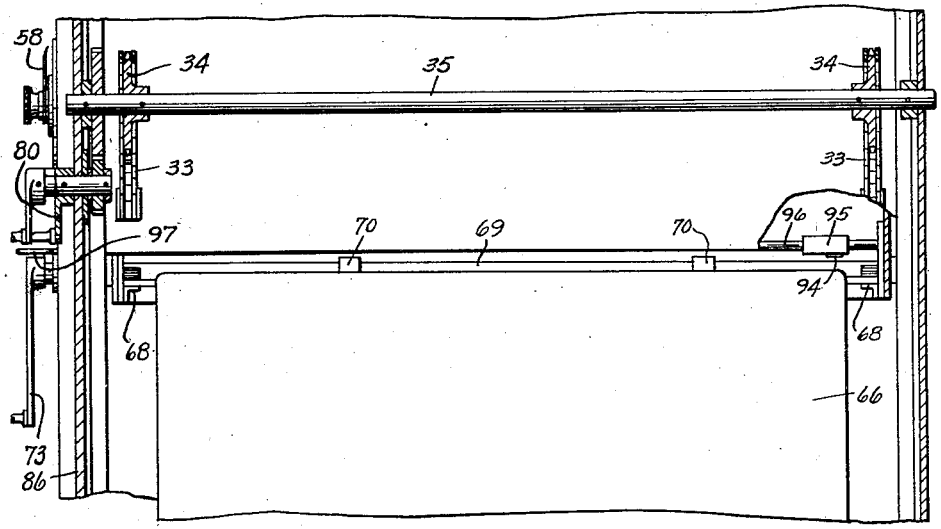
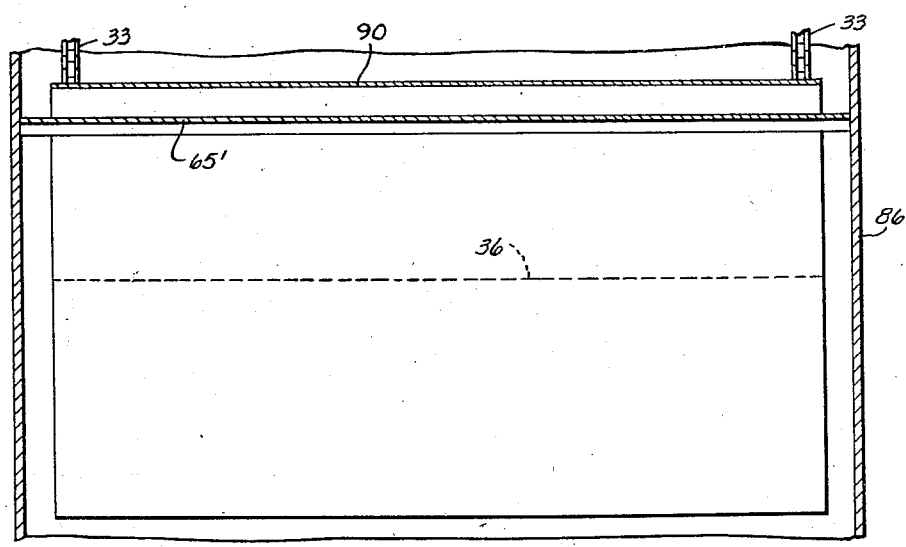
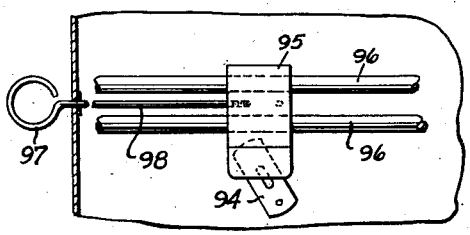
INVENTOR.
F. T. Powers
BY John D Morgan
ATTORNEY.

Patented May 16, 1933

1,909,424

UNITED STATES PATENT OFFICE

FRANK T. POWERS, OF DOUGLASTON, NEW YORK

PHOTOGRAPHIC CAMERA

Application filed May 6, 1929, Serial No. 360,693. Renewed October 6, 1932.

My invention relates to novel and useful improvements in photographic cameras and more particularly to mechanism for alternatively or selectively presenting light sensitive materials of different desired properties or sizes for exposure within the camera and so exposing them, with little or no waste of sensitive material, and to certain essential or desirable cooperating mechanisms.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:

Fig. 1 is a side elevation of the rear portion of a camera embodying my present invention;

Fig. 2 is a similar view, showing some of the parts in a different position;

Fig. 3 is a cross section taken on the line 3—3 of Fig. 1;

Fig. 4 is a cross section taken on the line 4—4 of Fig. 3;

Fig. 5 is a view similar to Fig. 4, but with the parts in the position shown by Fig. 2;

Fig. 6 is a partial cross section taken on the line 6—6 of Fig. 3;

Fig. 7 is a fragmentary detail view of certain parts shown in Fig. 1;

Fig. 8 is a cross section taken on the line 8—8 of Fig. 7;

Fig. 10 is a fragmentary section taken on line 10—10 of Fig. 1;

Fig. 11 is a cross section taken on the line 11—11 of Fig. 4;

Fig. 12 is a detailed sectional view taken on the line 12—12 of Fig. 3;

Fig. 13 is a detail sectional view taken on the line 13—13 of Fig. 12; and

Fig. 14 is a fragmentary detail of the severing means shown in Figs. 3, 6, 9 and 10.

Figure 9:
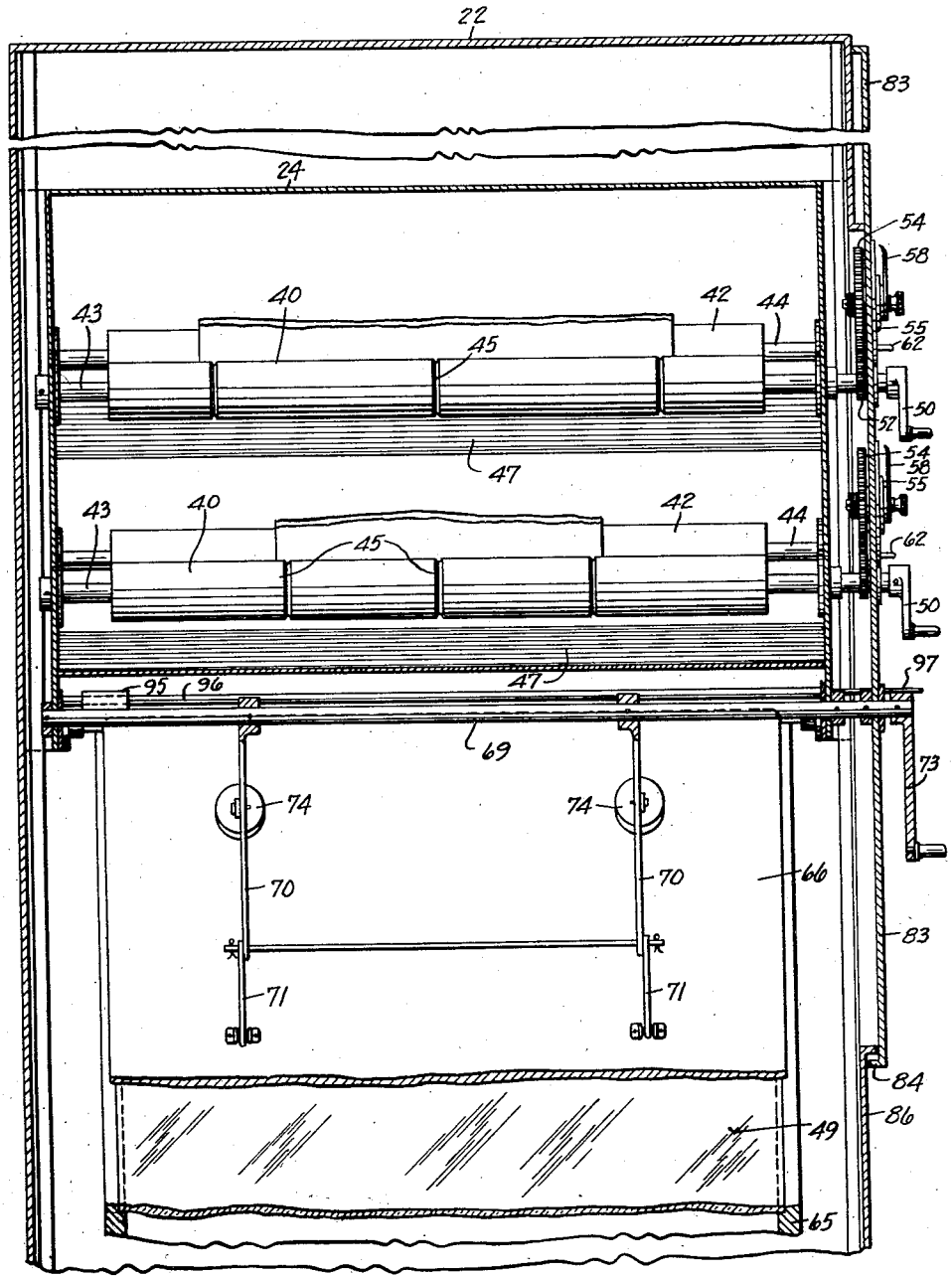
Fig. 9 is a cross section taken on the line 9—9 of Fig. 6.

The invention is directed primarily to novel and useful mechanism for photographically exposing sensitized material to the desired images and for manipulating the sensitized material from the exterior of a light-tight casing in such a manner as to effect the desired operation of the mechanism with ease and accuracy, at the same time eliminating waste of the relatively expensive sensitized material. The invention is further directed toward effecting an always exact feeding and positioning of the sensitized material and holding the sensitized material so fed and positioned while it is exposed to the image to be reproduced. The invention is further directed, in connection with the foregoing and other objects, towards producing a simple, sturdy, compact, reliable and economically manufactured device of the kind described.

Preferably, and as here shown, there are provided means for placing light sensitive material in image receiving position, which material may be selectively supplied from any one of a plurality of different sources of supply, for moving the sensitive material to variably position it with respect to the image area, for limiting the amount of sensitive material so exposed, for holding the sensitive material while being exposed, for severing the exposed portion of the sensitive material from the unexposed whereby the exposed portion may be removed and treated in such further manner as the nature of the material necessitates and for positioning another length of sensitive material of the same or different kind, in image receiving position, together with other desirable operations as will hereinafter be made apparent.

As here shown, each operation necessary to be performed in the normal working of the machine is controlled by means located exteriorly of the camera, thus facilitating the production of the desired results. Other cooperating mechanism, effecting the easy rapid and precise handling of the sensitized material are comprehended within my invention and will be hereinafter described in connection with the detail description.

Referring now to the embodiment illustrated by way of example in the accompanying drawings, the invention is shown applied to a copying camera, adapted to be operated in connection with a dark room, the back of the camera opening into or being accessible from the dark room. Certain parts of the camera are shown more or less conventionally to completely indicate in a general way such an exemplary embodiment. It will be understood that the invention in many of its features may be employed with other kinds of cameras and other photographic apparatus and in other relations.

In certain respects my invention is in the nature of an improvement on the apparatus shown in my prior application Ser. No. 578,022 filed July 27, 1922, and in other respects it comprises novel features independent of said prior application.

It will be understood that the foregoing general description, and the following detailed description as well, are exemplary and explanatory of the invention, but are not restrictive thereof.

In the preferred embodiment illustrated by the drawings, there is shown the back or rear portion of a photographic camera provided with the usual bellows 20, and a lens (not shown). Such a camera, as here shown, is adapted for use in the reproductive processes and may be provided with the usual accessories, such as focusing scales, shutters and the like in an obvious manner. For convenience, that portion of the camera housing the supply of photosensitive material and within which the image is cast and the other attendant operations are performed will be hereinafter referred to generally as the back 22.

Within the back 22, which is preferably of substantially prismatic shape, there is provided a supply means for holding a supply of photosensitive material, such as sensitized paper or flexible sensitized film, which means is shown in the present embodiment as comprising a box 24 adapted to receive and rotatably support shafts 26 and 27, which in turn support and position rolls of sensitized material 28. These rolls of sensitized material may be of different width, as shown, or may be of different grade or material, and are held against endwise movement by means of the collars 29 and 30 removably secured to shafts 26 and 27. The supply means 24 is mounted for limited vertical movement within the camera back 22 by means of plate 31 forming the front of the supply means 24, and running in trackways 32, whereby any deviation from the straight and vertical path of movement is eliminated. Connected to the plate 31 and near the side edges and bottom thereof are chains 33 running over sprocket wheels 34, mounted on shaft 35, the other end of said chains being attached to counterweight 36 normally positioned near the bottom portion of and inside the camera back 22. Thus supported, the supply means 24 will tend to remain in the desired position until moved for a purpose and in a manner to be later described.

Means are provided for alternatively feeding the sensitized material as desired from either of the rolls positioned within the supply means and, as best illustrated by Figs. 6, 7 and 8, comprise driven rolls 40 and idle pressure rolls 42, mounted on shafts 43 and 44 respectively, between which rolls the sensitized material is fed. These pressure rolls are circumferentially grooved as at 45 to receive the guide fingers 46 extending from guide plates 47 mounted on the front and sides of and within the supply means 24. Each pair of guide plates 47, form a feed slot through which the sensitized material is fed to exposure receiving position behind the flat sheet of glass 49, arranged substantially in the focal plane of the camera.

Means are provided for manipulating the feeding means for either web of sensitized material from the outside of the camera and for manipulating each web there is provided a small hand crank 50 pinned on shaft 43 carrying a pinion 52 meshing with idler 53 which in turn drives gear 54 mounted on stub shaft 57 which also carries a collar 55 supported by bushing 55' in a panel on the side of the camera. Gear 54 is loosely mounted on stub shaft 57 carrying a settable pointer 58 at its outer ends which pointer is frictionally driven by gear 54 through a friction coupling 60. Prior to each feeding operation the pointer 58 may be returned to zero, as indicated on the scale 61, and from this position it is advanced by the turning of the handle during the feeding operation and at any time shows the amount of sensitized material that has been fed since it was last reset. To limit the movement of the pointer and provide a ready means of resetting it to zero, there are provided stops 62 and 63 at the beginning and end of the scale 61.

Means for maintaining the sensitized material in the focal plane of the camera during the exposure period are provided and comprise a flat sheet of glass 49, slightly larger than the largest size of image to be reproduced, supported by frame 65 on beam 65' extending between the side walls of the camera. Immediately behind the glass and beneath the supply of sensitized material, a presser plate 66 is pivoted at 67 on inclined rail 68, and may be moved into and out of operative relation with the glass 49. For moving the presser plate in this manner, there is provided a horizontally-extending shaft 69 on which are mounted arms 70 pivotally connected with links 71 and 72. The forward ends of links 71 and 72 are connected to the back of the presser plate and rearward movement of hand lever 73, pinned to the shaft 69 at the outside of the camera, swings the presser plate 66 and at the same time moves the top portion slightly to the rear of the plate, slidingly pivoted at 69, thereby providing a space between the top of the presser plate and the sheet of glass 49 to allow the sheet of sensitized material to be fed into vertical exposure-receiving position. When the sensitized material is properly positioned between presser plate 66 and glass plate 49, the handle 73 may be moved forwardly to press the material against the glass plate 49. On links 72 there are provided collar members 74 which are pressed apart by spring 74' and the slotted ends of links 71 and 72 allow spring 74' to exert a resilient pressure on presser plate 66 when the handle is pulled forward.

Means are provided for vertically moving the supply means from outside the camera and comprise a crank 80 mounted on shaft 35 to which is geared suitable pointer mechanism 81 which indicates by means of scale 82, the position of the supply means 24 and counterweight 36. By simply reading the position of the pointer the operator determines the correct position of the supply means for the particular size of picture to be made.

Means are provided for allowing the feeding cranks 50, to move with the supply means while the latter is adjusted and for preventing the entry of light around said feeding means and comprise a panel 83 with inturned edge portions 84 slightly wider and considerably longer than the opening formed in the side 86 of the camera and over which the panel moves. This panel is supported in position by shafts 43, 69 and screws 87 which extend through it and as the supply means 24 carrying these shafts is moved up and down the panel is moved thereby and to the same extent. To insure that the panel is absolutely light-tight, angle bars 85 are run the length of and adjacent to the side edges of the panel.

Means are provided for masking the sensitized material and limiting the size of the image area actually needed comprising a member 90 mounted on counter weight 36 for the supply means 24 and movable with it while the upper portion of the image area is masked by the lower portion 92 of the supply means for the sensitive material. As the supply means is moved in its adjustment the two masking members move in opposite directions and this automatically centers the image area with respect to the sheet of glass 49 and at the same time correctly masks the upper and bottom edges of the image.

Means are also provided for severing the exposed sensitized material from the web at the edge of the exposed portion of the sensitized material, and these means are preferably arranged at the lower edge of the supply box and substantially on a line with the lower edge of the upper movable masking member. In the preferred embodiment as disclosed the knife is movable with the supply means and the masking means so that neither the supply means nor the knife need be raised or lowered to enable the knife to sever the sensitized web along the top edge of the exposed area thereof. In Fig. 4, the parts are shown positioned so as to allow a comparatively large size reproduction to be made, while Fig. 5 shows the parts positioned for a relatively small reproduction. These means comprise a knife 94 angularly mounted on block 95 slidable on rods 96 extending transversely of the camera. Normally and when not in use the knife is maintained at the extreme left of the camera as shown in Fig. 9 and after exposure it may be drawn across the camera to sever the exposed sensitized material by merely pulling outwardly on ring 97 formed as an extension of the rod 98 to which is attached the knife block 95. This action draws the knife across the width of the web of sensitized material and severs the exposed portion from the unexposed portion which has been shielded during the exposure by masking member 92. As soon as the paper has been severed the presser plate 66 is moved out of operative relation and the sensitized material no longer being supported against the glass plate 49 drops to the bottom portion of the camera.

Means are provided for permitting ready access to the various parts of the camera. A cover 100 at the rear of the supply means 24 allows a new supply of sensitized material to be placed in position in the camera and for that purpose is hinged at 101 and held closed by catch 102.

On the rear wall of the camera there are provided panels or doors 105 and 106 which may be held in position in any desired manner to close openings in the back wall of the camera respectively hinged at 107 and 108. The upper one of these panels 105 may be opened for replenishing the supply of sensitized material when either roll becomes exhausted and the lower panel or door 106 may be opened when it is desired to withdraw the exposed and severed sensitized material for such further treatment as may be necessary or desired. When the camera is to be used in connection with a dark room, the camera may have its back side built into one wall of the dark room and in such case, the panels 105 and 106 are preferably left in place, but may be permanently removed or left open if desired.

In the operation of the camera the operator focuses the lens on the copy, returns the pointers 58 to zero position or against the stops 62, turns crank 80 until pointer 81 indicates that the supply means 24 and masking members are correctly positioned for the size of picture desired, and then moves the handle 73 to back the presser plate 66 out of engagement with the glass plate 49. With the parts in this position he feeds the sensitized material from the proper roll by rotating one of the cranks 50 until pointer 58 indicates that the correct length of material has been fed. At this time, handle 73 is forwardly moved to press the face of the sensitized material into close contact with the rear face of the glass plate 49 and the exposure is made for the proper length of time.

As soon as the exposure has been terminated, the operator may pull on ring 97 to move the knife 94 across the web of sensitized material, if it be desired to sever the exposed portion from the main portion of the supply web of sensitized material, and then the operator returns the knife to its original position. However, it is not necessary to cut the web of sensitized material after each exposure, and it may be left in its web form, if desired, as for instance, when several exposures of short lengths of sensitized material are to be made, one after each other. After each exposure, the handle is then moved to the left carrying with it the presser plate 66, which allows the exposed sensitized material to drop to the bottom of the camera from which position it may be removed by opening the door 106. For each subsequent exposure, the steps and operations, as outlined above, are repeated.

The invention in its broader aspects is not limited to the specific mechanisms shown and described but departures may be made therefrom within the scope of the accompanying claims without departing from the principles of the invention and without sacrificing its chief advantages.

What I claim is:—

1. A photographic camera including in combination means for feeding variable lengths of sensitive material to exposure receiving position, means for severing the exposed sensitive material and means for variably positioning the severing means to allow the sensitive material to be cut without waste.

2. In a photographic camera the combination of means for feeding sensitive material to exposure receiving position and variably positionable means for separating the exposed material from the unexposed material.

3. A photographic apparatus including in combination means for feeding a length of sensitive material to image receiving position, means for variably determining the length of the sensitive material exposed and means positionable at the edge of the exposed area for severing the exposed portion of the web from the unexposed web.

4. A photographic camera including in combination means for feeding different lengths of sensitized material and means for centering the length so fed with respect to the axis of the lens, and means always adjacent the edge of the exposed area of the sensitized material for severing the exposed material.

5. A photographic camera including in combination movable means for holding a plurality of rolls of sensitized material, means for feeding the sensitized material to image receiving position, releasable means for holding the sensitized material in the focal plane of the camera and means for severing the exposed sensitized material.

6. A photographic camera including in combination movable means for holding a plurality of rolls of sensitized material, means for feeding the sensitized material to image receiving position, means for holding the sensitized material in the focal plane of the camera and means movable with the holding means for severing the exposed sensitized material.

7. A photographic camera including in combination means for feeding a web of sensitive material to image receiving position, variably positionable means for masking said web and means movable with the masking means for severing the exposed sensitive material.

8. A photographic camera including in combination means for feeding a web of sensitive material to image receiving position, means for centering the image with respect to the image field of the camera lens, variably positionable means for masking said web and means movable with the masking means for severing the exposed sensitive material.

9. A photographic camera including in combination movable means for holding a plurality of rolls of sensitized material, means for feeding variable lengths of the sensitized material to image receiving position, means for masking the sensitized material lying outside the image area, releasable means for holding the sensitized material in the focal plane of the camera and means movable with the holding means for severing the exposed sensitized material into the desired lengths.

10. A photographic camera including in combination movable means for holding a plurality of rolls of sensitized material, means for feeding variable lengths of the sensitized material to image receiving position, settable means for indicating the amount of material fed, means for indicating the position of the holding means, means for holding the sensitized material in the focal plane of the camera and means for severing the sensitized material into the desired lengths.

11. A photographic camera including in combination supply means for holding a roll of sensitized material, means for moving said supply means, masking means moved by said moving means to define the area of sensitized material to be exposed, means for releasably holding the sensitized material in the focal plane of the camera and means for severing the sensitized material substantially along the edge of one of the masking means.

12. A photographic camera including in combination supply means for holding a roll of sensitized material, means for feeding sensitized material therefrom to image receiving position, means for moving said supply means, masking means moved by said moving means to define the area of sensitized material to be exposed, means for releasably holding the sensitized material in the focal plane of the camera and means for severing the sensitized material substantially along the edge of one of the masking means.

13. A photographic camera including in combination supply means for holding a roll of sensitized material, means for moving said supply means, masking means moved by said moving means to define the area of sensitized material to be exposed, and means for releasably holding the sensitized material in the focal plane of the camera.

14. A photographic camera including in combination supply means for holding a roll of sensitized material, to be fed to image receiving position, means for moving said supply means, masking means moved by said moving means to define the area of sensitized material to be exposed, means movable with the supply means, for releasably holding the sensitized material in the focal plane of the camera, and means for severing the sensitized material substantially along the edge of the exposed area.

15. In a camera, vertically movable supply means from which a web of sensitized material is adapted to be fed to image receiving position, a counterweight for the supply means and masking means positionable by movement of the supply means whereby the area to be exposed is defined.

16. In a camera vertically movable supply means for selectively supplying webs of different widths to image receiving position, means opposing the movement of said supply means and tending to retain the supply means in any position of rest, means on the supply means for defining one edge of the image area, other means mounted for movement in a direction opposite to that of the supply means for defining an opposite edge of the image area and means movable with the supply means for severing the web at substantially one edge of the image area.

17. A photographic camera, including in combination means for holding a plurality of sources of supply of sensitive material and means for variably positioning said means with respect to the image area.

18. A photographic camera including in combination supply means for holding a plurality of sources of supply of sensitized material, means for moving the supply means and severing means operable on the sensitive material and movable with the supply means.

19. A photographic camera including in combination supply means for feeding variable lengths of sensitized material to image receiving position, means for moving said supply means with respect to the image area and means movable with the supply means for holding the sensitized material in the focal plane of the camera.

20. A photographic camera including in combination supply means for feeding sensitized material to image receiving position, means for moving said supply means with respect to the image area and means for holding the sensitized material in the focal plane of the camera.

21. In a photographic camera the combination of a flat transparent member parallel to the focal plane of the camera, a presser plate releasably to maintain a sensitized element in the focal plane of the camera, a pivot about which the presser plate moves and means for moving the pivot to and from the transparent member whereby the sensitized element may be replaced.

22. In a photographic camera, the combination of a presser plate, a transparent member between which and the presser plate a sensitized sheet may be held in the focal plane of the camera and means for selectively feeding variable lengths and widths of sensitized material into the focal plane.

23. A photographic camera including in combination movable means for holding a web of sensitized material, means operable from without the camera for feeding the web into the focal plane of the camera and means operable from without the camera for regulating the size of the image area.

24. A photographic camera including in combination movable means for holding a plurality of rolls of sensitized material, means operable from without the camera for feeding the web into the focal plane of the camera and means operable from without the camera for regulating the size of the image area.

25. A photographic camera including in combination supply means from which a plurality of webs of sensitized material are fed to image receiving position, means for moving the supply means with respect to the image area and means operable from without the camera for controlling the movement of the supply means and the feed of the sensitized webs.

26. In a camera, the combination of means for selectively feeding webs of sensitized material of different widths, a pair of masking members conjointly movable toward and away from each other in the direction of the web feed, and means for severing the web substantially along the edge of one of the masking members.

27. In a camera, supply means from which a web of sensitized material is adapted to be fed to image receiving position, means for moving the supply means with respect to the image receiving position and masking means conjointly movable toward and away from each other to vary the area of exposure.

28. In a camera, vertically movable supply means from which a web of sensitized material is adapted to be fed to image receiving position, masking means mounted on said supply means, and cooperating masking means positionable by movement of the supply means.

29. A photographic camera including in combination supply means for holding a roll of sensitized material, to be fed to image receiving position, means for moving said supply means, masking means moved by said moving means to define the area of sensitized material to be exposed, means movable with the supply means, for releasably holding the sensitized material in the focal plane of the camera, and means for severing the sensitized material substantially along the edge of one of the masking means.

30. In a camera, vertically movable supply means from which a web of sensitized material is adapted to be fed to image receiving position, a counterweight for the supply means, masking means positionable by movement of the supply means whereby the area to be exposed is defined, and means for centering the area to be exposed with respect to the camera lens.

31. In a camera, vertically movable supply means from which a web of sensitized material is adapted to be fed to image receiving position, a counterweight for the supply means, masking means positionable by movement of the supply means whereby the area to be exposed is defined, and means for severing the sensitized material along an edge of the exposed area thereof.

32. In a camera, the combination of means for selectively feeding webs of sensitized material of different widths, means for centering the fed webs with respect to the axis of the camera lens including masking members conjointly movable in opposite directions, and means for severing the exposed portion of the web.

In testimony whereof, I have signed my name to this specification.

FRANK T. POWERS.